J. E. WALTROWICZ.
WINDMILL CONTROL MECHANISM FOR TANK SUPPLY.
APPLICATION FILED NOV. 3, 1919.
1,373,543.
Patented Apr. 5, 1921.
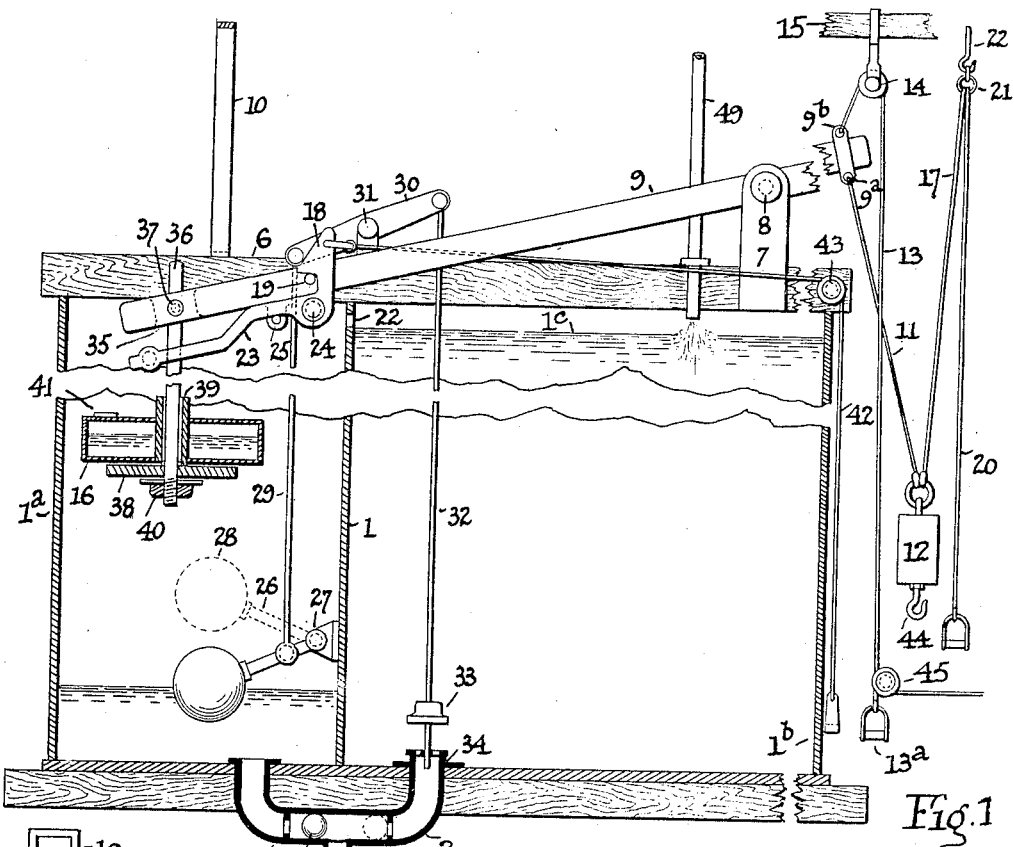
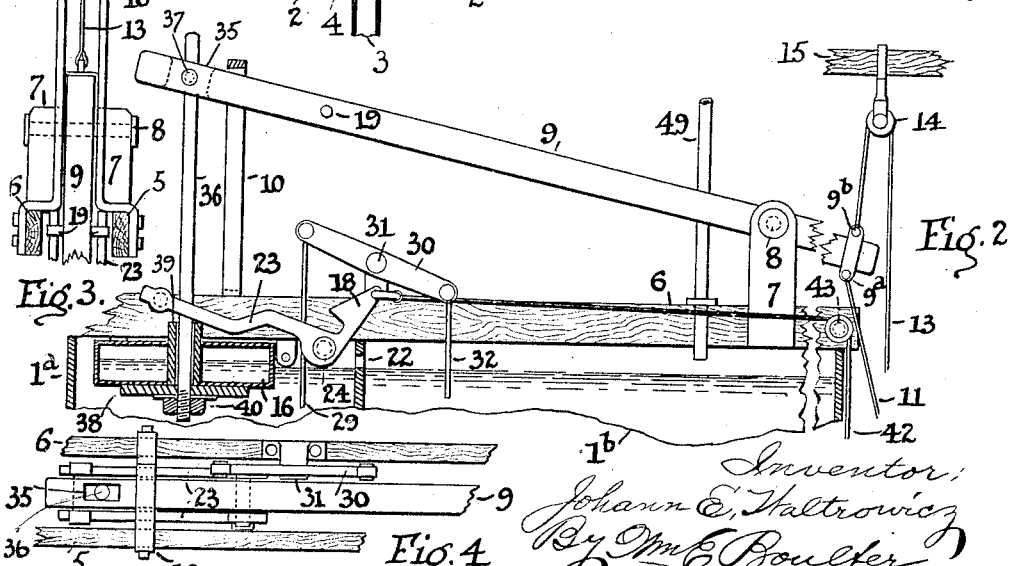

UNITED STATES PATENT OFFICE.

JOHANN EDUARD WALTROWICZ, OF GERANG, VICTORIA, AUSTRALIA.

WINDMILL-CONTROL MECHANISM FOR TANK-SUPPLY.

1,373,543.  Specification of Letters Patent.  Patented Apr. 5, 1921.

Application filed November 3, 1919. Serial No. 335,277.

*To all whom it may concern:*

Be it known that I, JOHANN EDUARD WALTROWICZ, a subject of the King of Great Britain and Ireland, etc., residing at Gerang, in the State of Victoria, Commonwealth of Australia, have invented certain new and useful Improvements in Windmill-Control Mechanism for Tank-Supply; and I do hereby declare the following to be a full, clear, and exact description of the invention, such as will enable others skilled in the art to which it appertains to make and use the same.

This invention provides improved mechanism to automatically start or stop a windmill according to whether a supply of water is to a predetermined extent depleted or restored. I provide connected tanks, or a subdivided tank to contain the water which the windmill will supply by pumping. One tank is termed the float tank, and the other the bulk tank, the latter being advantageously the larger. Provided wind is available my mechanism which is connected with the windmill and the tanks will prevent undue depletion of the water in these tanks, and there will be no overflows from the tanks. Such overflows from other tanks are usual and cause damage, and waste the water.

The drawings herewith are diagrammatic, and not to scale but enable the construction to be explained. The invention is not limited to the minor details shown.

Figure 1 is a partly sectional side view, and shows part of a subdivided tank with my mechanism in one position in which water is being pumped by the mill into the bulk tank which is full and is about to begin filling the float tank. Fig. 2 is similar to, but omits some of the mechanism in Fig. 1; and it shows parts in positions assumed when both the tanks are filled and the wind wheel has been stopped. Fig. 3 shows an end elevation of various details in cross section through frame beams. Fig. 4 is a plan of the part of the frame beams with some attached construction.

The mechanism although it will work automatically is also adapted to be controlled when desired by hand; and hand mechanism will still be provided to start or stop the mill when desired. Stoppage may be required for effecting repairs or for lubrication. Any suitable material or materials may be used in carrying the invention into effect.

In these drawings a tank is shown subdivided by a partition 1 into two parts $1^a$, $1^b$ of which part $1^a$ is preferably of relatively small, and part $1^b$ of relatively large capacity. These parts have at the base a connection such as a pipe 2, which is connected to a discharge pipe 3. The said piping is fitted with any suitable control valve 4, shown as a ball valve explained hereinafter. When water is drawn off for supplying any requirement it can best in the first instance be derived from tank $1^a$, and later on, when the supply in the latter is reduced to a predetermined extent, further water required will be derived from tank $1^b$ as will be explained. Normally there will be a considerable supply of water in tank $1^b$ whatever may be the water level in tank $1^a$.

At some predetermined low level of water in tank $1^a$ my mechanism will be operated so as to cause the windmill to begin pumping water into tank $1^b$, and pumping will continue until a predetermined high water level $1^c$ in tank $1^b$ is reached, further water pumped in being transferred into tank $1^a$, through a port 22 which connects tanks $1^b$ and $1^a$. When a predetermined high level is established in tank $1^a$ my mechanism as will be explained causes pumping to stop.

Framing to support my mechanism such as beams 5, 6 is provided over the tanks. On this framing are pillars 7 between which is pivoted at 8 a rocking lever 9. In Figs. 1 and 2 beam 5 is omitted, to expose mechanism between the beams. Standing on the frame beams is a guide 10 having between its sides a slot in which lever 9 swings in a vertical plane and is prevented from swaying laterally out of alinement. The near side of guide 10 is omitted from Figs. 1 and 2.

At one end of lever 9 are connecting means as eyes $9^a$, $9^b$. A table 11 extends from eye $9^a$ to a weight 12 shown in raised position in Fig. 1 in which lever 9 is fixed. When not so fixed weight 12 can descend and move the lever with it to the position in Fig. 2. Lever 9 in Fig. 1 is fixed by hooks 18 which engage pins 19 projecting from the lever. When lever 9 is allowed to descend at the end having weight 12, the weight will by a connection 17 to the wind wheel tail (not shown) pull that tail into the known position which stops rotation of the said wheel.

To allow of stopping the wind wheel by hand when desired a known connection 20 to the wind wheel tail is provided. Parts 17 and 20 may be as shown at 21 linked to a connection 22 to the wind wheel tail.

There is a cable 13 extending from eye 9$^b$ over a support, as pulley 14 on framing 15 which may be attached to an overhead mill wheel platform provided the tanks are near the windmill. 13$^a$ is any conveniently placed handle for manual operation of cable 13 if desired. Hooks 18 are carried on arms 23 which are pivoted as by a pin 24 extending through frame beams 5, 6, and in Fig. 1 lever 9 extends within a recess or space between arms 23 which may be on a U-shaped body. The weight of parts 23 normally sets hooks 18 in the position in Fig. 1, and the hooks are beveled so that when the lever carrying pins 19 descends at that end the pins strike the bevels, and the hooks swing clear and allow the pins to continue descending, whereupon the hooks return and engage the pins, and fix the lever accordingly. The normal setting of the hooks is effected by providing on the framing a stop 25 under parts 23.

In the lower part of tank 1$^a$ is a lever 26 suitably hinged as at 27 to a fixed support and carrying a buoyant member 28 which at times is submerged. A link 29 connects lever 26 with another lever 30 which is pivoted at 31 and connected by a suitable member 32 to a valve 33 which closes a port 34 of pipe 2 in tank 1$^b$ except when the water level in tank 1$^a$ is so low as to depress member 28, and (by the connections described) open valve 33, allowing water from tank 1$^b$ to be drawn through pipe 2, as in Fig. 1 the ball 4 being then by pressure of the water moved to close the passage up into tank 1$^a$.

Lever 9 is shown with a slot 35 through which extends a stem 36 of a float 16, the stem being pivoted to the lever at 37. The float is shown resting on a support 38, but it is, at suitable times, floated clear above that support by the rise of water in tank 1$^a$. The float carries a striker shown as a sleeve 39, and when the float rises clear above support 38 so that the striker reaches the tail of arms 23, the pressure of the striker will move the arms so as to release the hooks from pins 19. The lever 9 at this time is not carrying the weight of float 16 but only the weight of stem 36 and some parts attached to the stem base. The result is that weight 12 pulls down the lever and also cable 17 and part 22 for the purpose of stopping rotation of the mill and thus stopping pumping.

Means are provided to adjust striker 39 for the required position seen in Fig. 2. Thus 40 is an adjustable nut on the screwed end of stem 36, and it sets higher or lower as required the support 38 of float 16, which is shown as a hollow annular vessel, slidable along stem 36, sleeve 39 projecting upwardly to an appropriate point. The buoyancy of float vessel 16 is due preferably or mainly to contained air, and its weight is regulated preferably by contained liquid, 41 being a filling inlet which is closed at will.

The lever 9 in moving to the position in Fig. 2 raises support 38 up to float 16.

A pulley 45 is shown to enable cable 13 to be extended in any suitable direction to some actuating point, and any other cable may pass over pulleys or have guides not shown.

I provide means for keeping weight 12 in lowered position when desired. Thus a hook 44 on it may receive extra weight. 49 is a pipe from the windmill pump. A cable 42 shown passing over a pulley 43 is attached to hooks 18 to enable a person to release the lever by hand at will, to stop the mill. It will be assumed that the mill has stopped, and that then water is drawn from tank 1$^a$, so that the weights of the float, its stem, and the stem base attachments act unitedly, so that the float and these attached parts become lowered and depress that end of lever 9 until a predetermined low level is reached, whereupon pins 19 engage hooks 18. By such movement the lever 9 lifts cable 11 and weight 12, and produces the position of Fig. 1, that is, cable 17 is released sufficiently to leave the wind wheel tail free, so that the mill can pump water into tank 1$^b$.

Float 16 and its stem may hang in the air when the water level in tank 1$^a$ is low as shown in Fig. 1. When water is discharging from tank 1$^a$ and valve 33 is closed the water pressure moves ball 4 over to the dotted position.

The delivery pipe 3 leads in some cases to ball cocks which feed animal drinking troughs automatically.

Having described this invention, what is claimed by Letters Patent is:—

1. The combination with a bulk tank, a float tank, a tubular connection between the tanks having a discharge opening, and a valve in said connection controlling the communication between the two tanks and the said opening, as described, of a float in the float tank and connections between said float and a wind wheel tail operating to stop or start the wind wheel according to the water level in the float tank.

2. The combination with a tank, a float therein, a striker on the float, and a support for said float, of a stem carrying the support and extending upwardly above the latter and along which stem the said float and a striker are movable, a lever to which the stem is pivotally connected, weighted connections between the said lever and a wind wheel tail, and means for holding the lever down at the float end when the water in the float tank is low, said holding means being operatable by the striker when the float rises to effect the release of the lever for the purpose set forth.

3. The combination with a tank, a hollow float therein provided with means for admitting a liquid thereinto whereby to regulate the weight of the float, a striker on the float, and a support for said float, of a stem carrying the support and extending upwardly above the latter and along which stem the said float and striker are movable, a lever to which the stem is pivotally connected, weighted connections between the said lever and a wind wheel tail, and means for holding the lever down at the float end when the water in the float tank is low, said holding means being operatable by the striker when the float rises to effect the release of the lever for the purpose set forth.

4. The combination with a tank, a float therein, a striker on the float, and a support for said float, said support being adjustable to vary the height of the float and consequently the striker thereon, of a stem carrying the support and extending upwardly above the latter and along which stem the said float and striker are movable, a lever to which the stem is pivotally connected, weighted connections between the said lever and a wind wheel tail, and means for holding the lever down at the float end when the water in the float tank is low, said holding means being operatable by the striker when the float rises to effect the release of the lever for the purpose set forth.

5. The combination with a tank, a float therein, a striker on the float, and a support for said float, of a stem carrying the support and extending upwardly above the latter and along which stem the said float and striker are movable, a lever to which the stem is pivotally connected, weighted connections between the said lever and a wind wheel tail, projections on the lever, and hooks adapted to engage said projections and to be operated by the striker when the float rises to effect the release of the hooks from the projections, for the purpose set forth.

6. The combination with a bulk tank adapted to be supplied by a windmill pump, and a float tank having means to receive water from the bulk tank when the latter is full, of a tubular connection between the tanks at their base, an automatic valve to control an outlet from the connection, a valve to control passage of water from the bulk tank to the connection, and means whereby the occurrence of low water in the float tank will effect the opening of the last-mentioned valve and whereby a rise in the level of the water in said float tank will close said valve.

7. The combination with a bulk tank adapted to be supplied with water by a windmill pump, and a float tank having means to receive water from the bulk tank when the latter is full, of a float in the float tank, a connection between the two tanks at their base, an automatic valve to control an outlet from the connection, a valve to control passage of water from the bulk tank to the connection, and connections between the float and the last-mentioned valve to open it when the water gets low in the float tank and close it when the water level rises, all as set forth.

8. The combination with a bulk tank adapted to be supplied by a windmill pump, and a float tank having means to receive water from the bulk tank when the latter is full, of a tubular connection between the tanks at their base, a ball valve within said connection adapted to allow water to be drawn from the float tank until the water therein is at a low level and then allow water to be drawn from the bulk tank as described, of a valve to control passage of water from the bulk tank to the connection between the two tanks, and means whereby the occurrence of low water in the float tank will effect the opening of the last-mentioned valve and whereby a rise in the level of the water in said float tank will close said valve.

In witness whereof I have hereunto set my hand.

JOHANN EDUARD WALTROWICZ.